July 6, 1954 — W. P. OEHLER ET AL — 2,682,738
OFFSET DISK HARROW

Filed June 27, 1949 — 6 Sheets-Sheet 1

INVENTORS.
WILLIAM P. OEHLER
CHARLES H. YOUNGBERG
BY
ATTORNEYS

July 6, 1954  W. P. OEHLER ET AL  2,682,738
OFFSET DISK HARROW

Filed June 27, 1949  6 Sheets-Sheet 2

INVENTORS.
WILLIAM P. OEHLER
CHARLES H. YOUNGBERG

ATTORNEYS

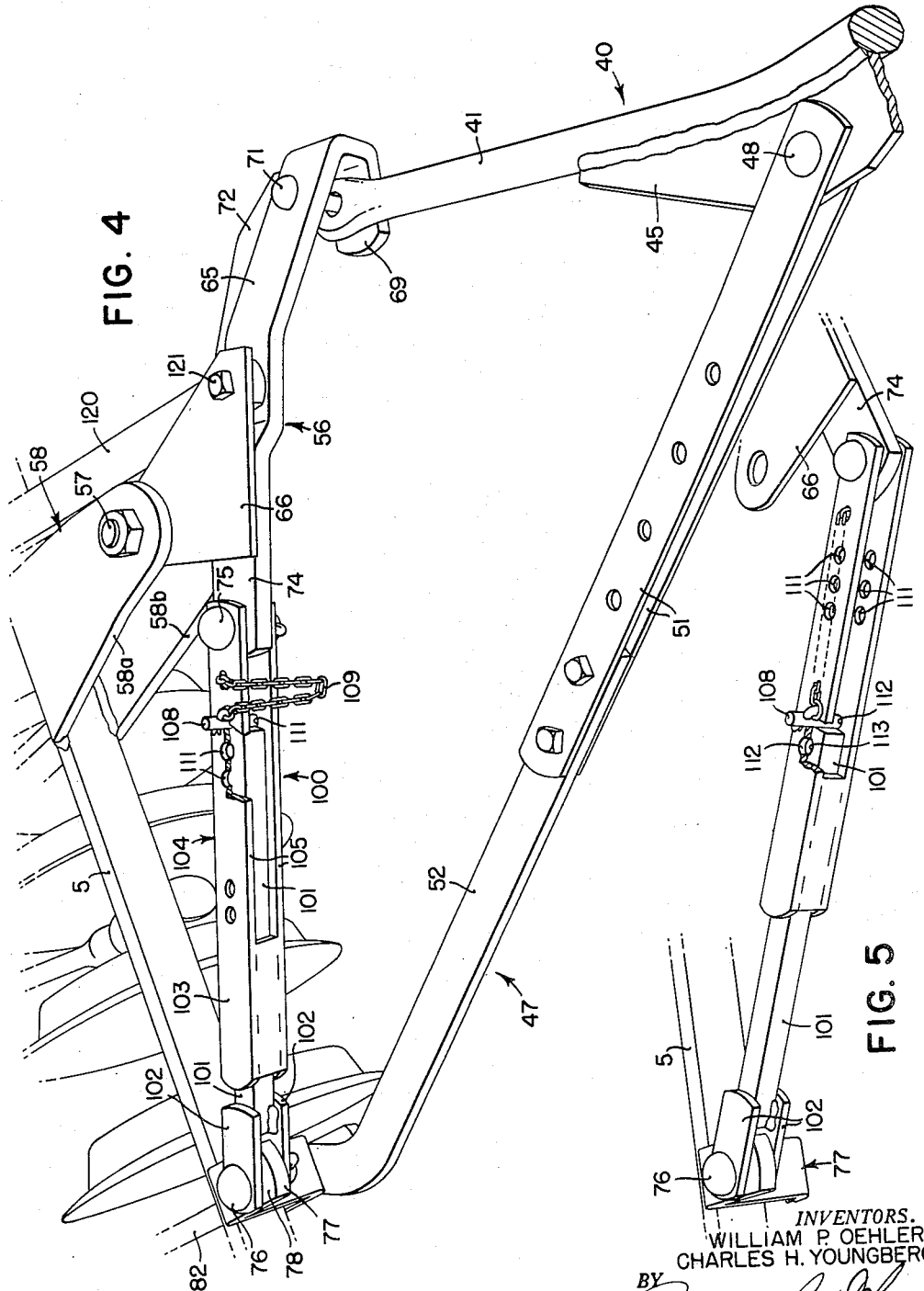

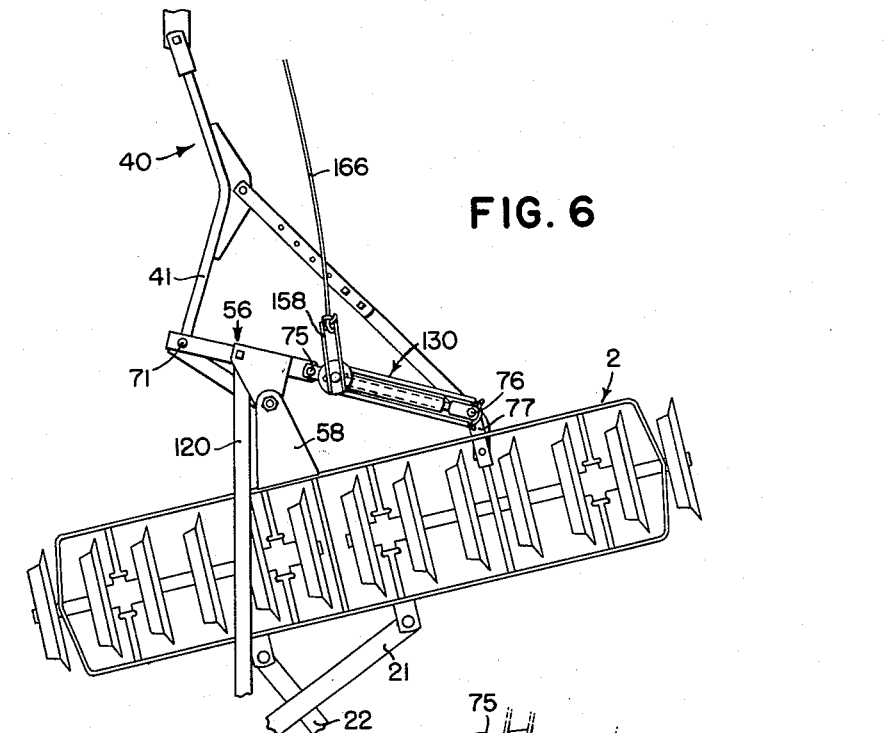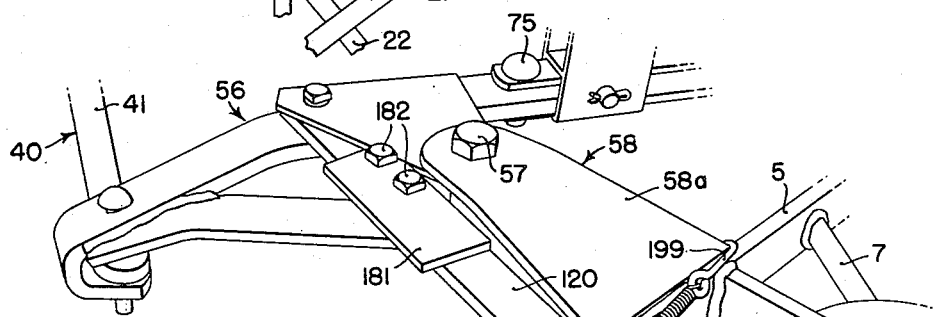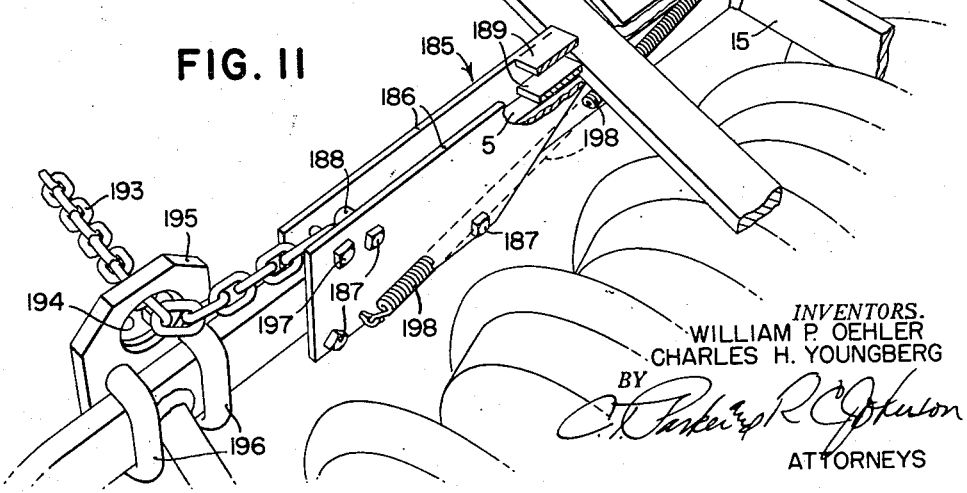

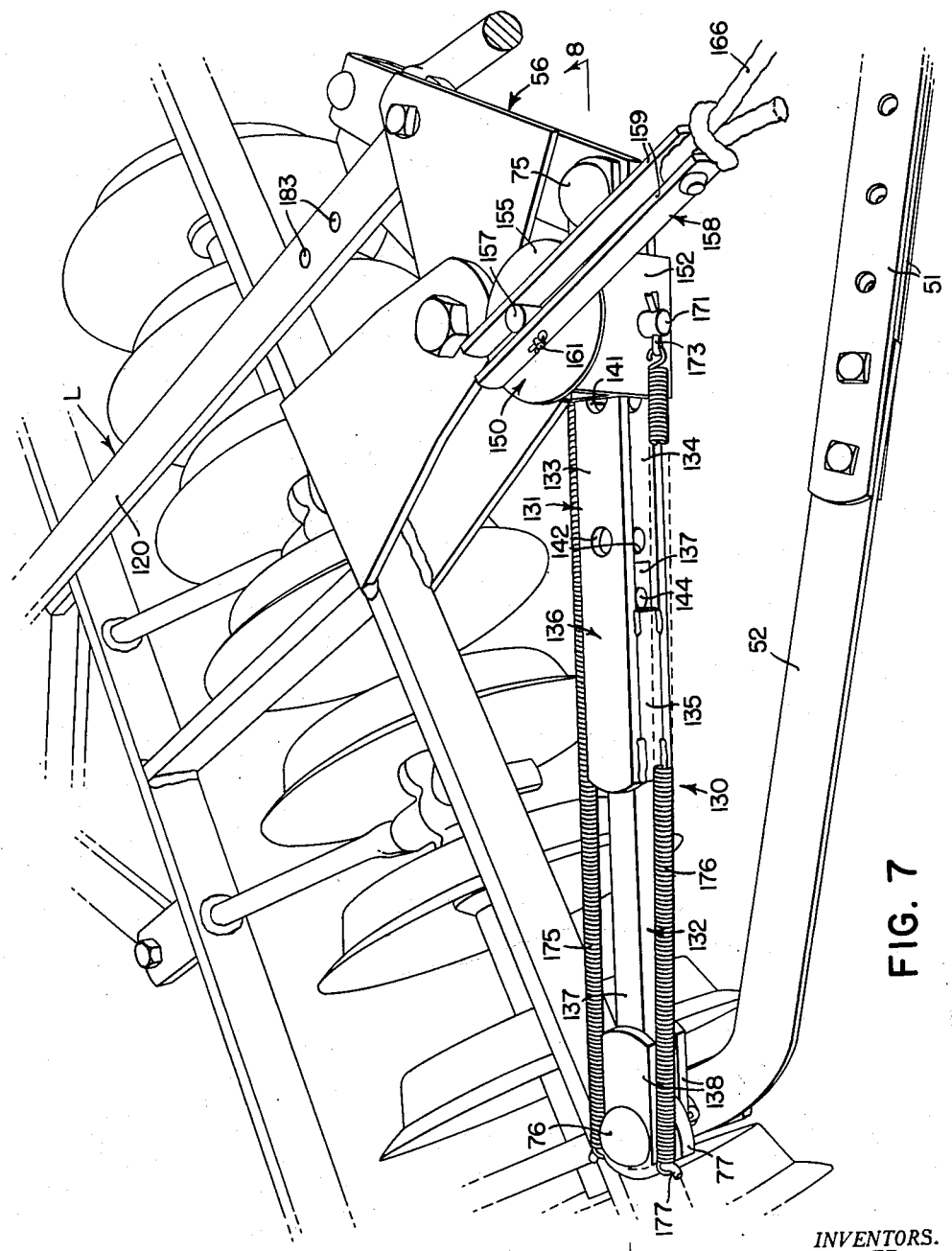

July 6, 1954  W. P. OEHLER ET AL  2,682,738
OFFSET DISK HARROW
Filed June 27, 1949  6 Sheets-Sheet 6
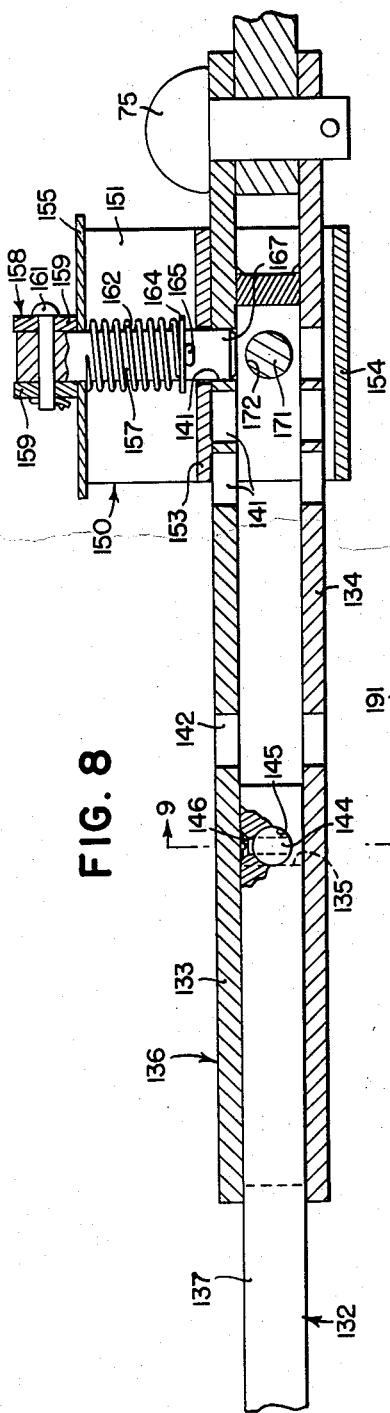
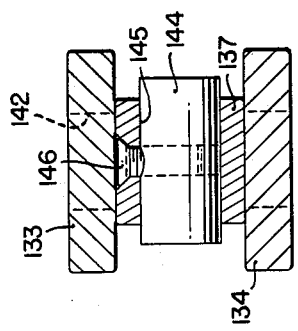
INVENTORS.
WILLIAM P. OEHLER
CHARLES H. YOUNGBERG
ATTORNEYS Patented July 6, 1954

2,682,738

UNITED STATES PATENT OFFICE 2,682,738

OFFSET DISK HARROW

William P. Oehler and Charles H. Youngberg, Moline, Ill., assignors to Deere & Company, Moline, Ill., a corporation of Illinois Application June 27, 1949, Serial No. 101,534

13 Claims. (Cl. 55—81.7)

This application is a continuation-in-part of our co-pending application, Serial No. 5,256, filed January 30, 1948, now Patent Number 2,610,445.

The present invention relates generally to agricultural implements and more particularly to offset disk harrows.

The object and general nature of the present invention is the provision of a disk harrow of the offset type having front and rear gangs normally movable from a straightened parallel or transport position into an angled or working position as an incident to the soil pressure acting against the disks when the machine is propelled forwardly, but which does not require any locks, latching means or the like for holding the disks at the desired angle, irrespective of adverse soil conditions and/or variations in soil conditions or the like.

More particularly, it is a feature of this invention to provide a disk harrow of the offset type which is specially constructed and arranged to be hitched to a farm tractor and operated thereby conveniently and efficiently. More specifically, it is a feature of this invention to provide an offset disk harrow incorporating a linkage acting between the front and rear gangs and connected to one side of the hitch structure for the harrow so that the force of the draft acting on the linkage for swinging the rear gang relative to the front gang with an angled or working position so acts at such mechanical advantage that soil pressure acting against the disks, particularly on the disks of the rear gang, is not effective to swing the gangs into a position of lesser angle, yet the linkage and associated parts are so arranged that swinging of the gangs into their transport or parallel straightened position may easily and quickly be effected.

A further feature of this invention is the provision of a new and improved angling or control mechanism which is particularly adapted for use with the above mentioned offset disk harrow and which will permit straightening and angling the gangs from the tractor seat and without requiring that the tractor have implement-operating power cylinders or the like. It is a further feature of this invention to provide an angle control means so constructed and arranged that backing the harrow will automatically bring the harrow gangs into a straightened position facilitating rearward movement of the harrow. Another feature of this invention is the provision of a right-turn control particularly adapted for use with a harrow having an angle control of the above type, namely, one in which when the outfit is backed the gangs are normally restrained against movement beyond their straightened position, the right-turn control being constructed and arranged to override such restraint, whereby the harrow may readily be moved into the opposite angle, when desired, as to facilitate a right turn (assuming that the harrow is normally arranged to turn to the left).

Still further, another feature of the present invention is the provision of new and improved right-turn mechanism which responds to a turn of the tractor to the right but which operates entirely independent of the angling mechanism, that is, without losing the setting of the angle control means.

These and other objects and advantages of the present invention will be apparent to those skilled in the art after a consideration of the following detailed description, taken in conjunction with the accompanying drawings, in which:

Figures 4 and 5 are perspective views showing the details of one form of gang angle control mechanism;

Figure 6 is a fragmentary plan view similar to Figure 1, showing a modified form of the present invention;

Figure 7 is a perspective view of the angle control unit incorporated in the harrow shown in Figure 6;

Figure 8 is a sectional view taken generally along the line 8—8 of Figure 7;

Figure 9 is a section taken along the line 9—9 of Figure 8.

Figure 10 is a fragmentary plan view similar to Figure 6 but showing a right-turn control and the angle control of Figures 6–8 arranged to operate with the right-turn control; and Figure 11 is a fragmentary perspective view showing the right-turn-responsive latch means and other parts in the positions they occupy when the harrow is positioned to make a right turn.

Figure 1:
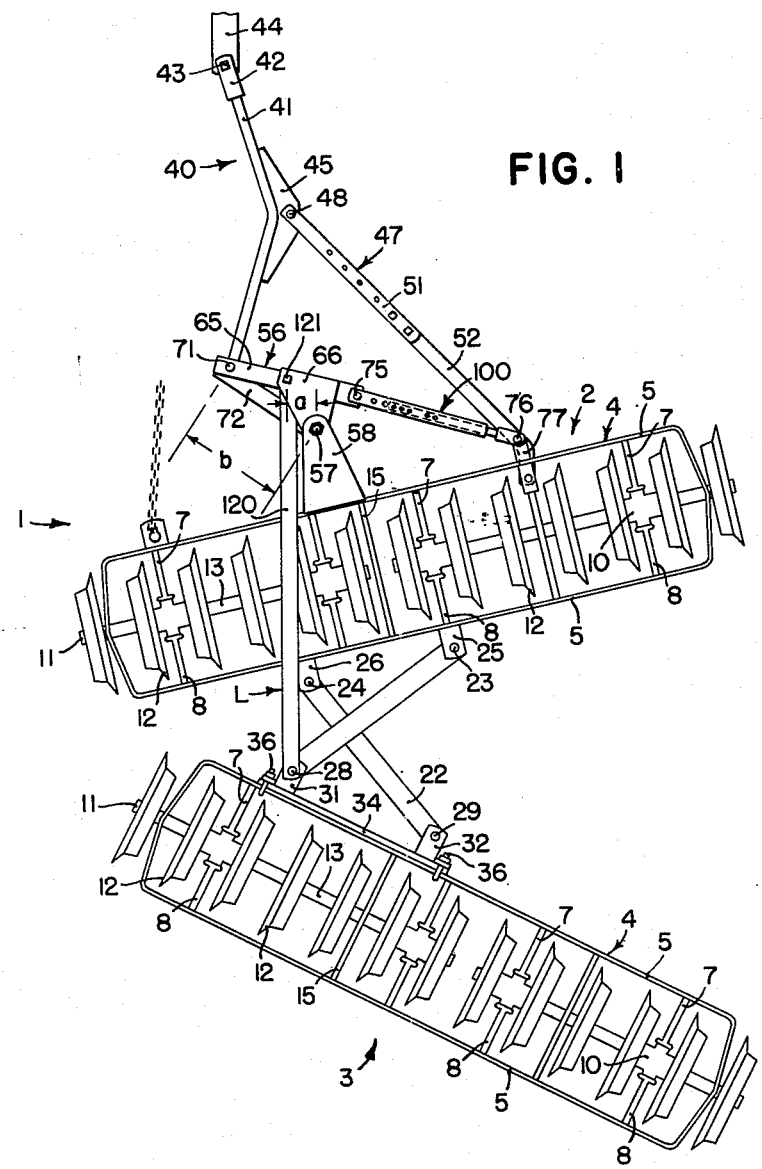
Figure 1 is a plan view of an offset disk harrow incorporating the present invention, the harrow being shown in angled or working position.

Referring now to the drawings, the offset disk harrow which has been chosen to illustrate the principles of the present invention is indicated in its entirety by the reference numeral 1 and comprises a front gang 2 and a rear gang 3, each of the gangs including a horizontally disposed frame 4 made up of a pair of bars 5 having their ends bent inwardly and welded together to form a generally rectangular frame. The rear gang frame is of similar construction and like reference numerals are employed. Each frame carries a plurality of pairs of bearing standards 7 and 8, each pair being disposed in downwardly converging relation and welded at their upper ends to the frame bars 5 and at their lower ends are secured to a disk gang bearing unit 10. So far as of the present invention is concerned, the latter is of conventional construction and provides for the reception of a gang bolt 11 on which disks 12 are disposed, with their spacing spools 13 between the disks. The central portion of each of the frames 4 is reenforced by a cross bar 15 the ends of which are welded to the central portions of the bars 5 forming the associated frame 4.

The front and rear gangs 2 and 3 are pivotally interconnected for movement into and out of angled and transport or parallel positions by a pair of angling links 21 and 22, the front ends of which are connected by pivots 23 and 24 to a pair of brackets 25 and 26 fixed, as by welding, to the rear bar 5 on the front gang frame 4. The rear ends of the angling links 21 and 22 are pivotally connected, as at 28 and 29, to a pair of brackets 31 and 32 that are fixed, as by welding, to a rear bar 34 that is fixed to the front bar 5 of the rear gang frame 4 by means which accommodates shifting the bar 34 to different positions, preferably by such means as a pair of U-bolts 36. The interconnecting links 21 and 22 are disposed in contact with one another so that the harrow runs level in operation and does not tend to dig in at one end of one gang or at the other end of the other gang.

The harrow 1 is adapted to be connected to a source of power, such as a farm tractor, by a hitch structure, indicated in its entirety by the reference numeral 40. The hitch structure 40 comprises a hitch bar 41 having a bifurcated portion 42 formed at its forward end and apertured to receive a hitch pin 43 by which the harrow may be connected to the drawbar 44 of a tractor. The bar 41 is bent laterally outwardly and rearwardly at its rear portion and has its central portion reenforced by a generally triangular shaped plate 45. The hitch structure 40 also includes a bracing member 47 which at its forward end is pivotally connected, as at 48, to the plate 45, the member 47 comprising two telescopically associated parts 51 and 52 which have a plurality of apertures providing for attachment of one part to the other in different positions of adjustment thereby to vary the amount of offset relative to the propelling tractor.

Figures 2, 3:
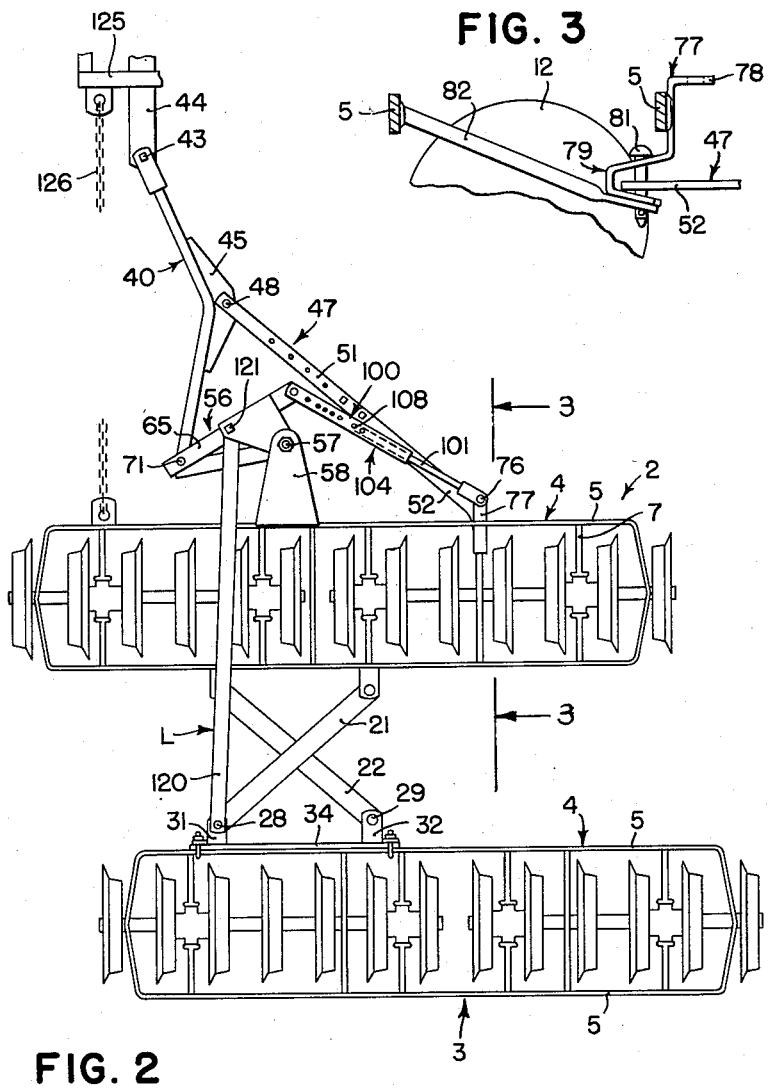
Figure 2 is a view showing the harrow of Figure 1 in its transport or straightened position.
Figure 3 is a fragmentary sectional view taken along the line 3—3 of Figure 2.

An angling lever 56 is pivotally mounted, as at 57, on a forwardly extending bracket 58 that is fixed, as by welding or the like, to the front bar 5 of the front gang frame 4. The angling bell crank lever 56 comprises a first bar 65 fixed, as by welding, to a pivot plate 66 that is apertured to receive the pivot 57 carried by the bracket 58, the latter member including upper and lower sections 58a and 58b (Figure 4) welded at their rear ends to the front frame bar. The outer end of the bell crank bar 65 is turned downwardly and then inwardly, as indicated at 69, the adjacent portions being apertured to receive a pivot pin 71 by which the rear end of the hitch bar 41 is pivotally connected therewith. This portion of the bar, which forms one arm of the bell crank, is reenforced by a bracing section 72 the rear or inner portion of which is apertured to receive the lower portion of the pivot pin 57. By virtue of this construction, just described, the bell crank member 56 is rigid in a generally vertical direction. The second arm of the bell crank 56 is formed by the plate 66, and a third arm of the bell crank 56 is formed by an extension 74 of the bar 65, the extension 74 being apertured to receive a quick detachable pin 75 by which one end of an adjustable angle-determining means may be connected, such means being adapted to be connected at its other end by a pivot pin 76 with a lug 77 carried adjacent one end of the front disk gang frame 4. Preferably, as best shown in Figure 3, the bracket or lug 77 receiving the pin 76 comprises a generally V-shaped bar having one portion welded to the front frame bar, an upper portion 78 extending forwardly and apertured to receive the pin 76 and a lower portion 79 which is bent rearwardly, downwardly and then forwardly, and apertured, to receive a pin 81 by which the rear end of the adjustable hitch member brace 47 may be pivotally connected to the front gang 4. The lug or bracket 77 is reenforced by a brace 82 extending to the rear frame bar, as best shown in Figure 3.

It will be understood by those skilled in the art that in operation the gangs of an offset disk harrow are arranged at an angle to one another and the hitch is adjusted so that the couple established by the tendency of the disks of the front gang to run in one direction, and the tendency of the disks of the rear gang to run in the other direction serves to hold the disk harrow implement at one side of the line of draft pull that normally extends through the front end of the hitch bar 41 where the same is connected at 43 to the drawbar 44 of the tractor. It will be also understood that the harrow may be arranged for transport by reducing the angle between the disk gangs to substantially zero, whereupon the disks will roll forwardly without cutting into the ground.

Referring for the moment to Figure 2, it will be noted that when the harrow is arranged with its gangs parallel, driving the tractor 44 forwardly will result in pulling up on the right end of the front gang 4 through the hitch member 47 while the rear end of the hitch member 41 exerts a force through the pivot 71 against the bell crank member 56 which acts through rear gang angling means L to pull up on the left end of the rear gang. This readily brings the gangs into their angled or operating position, as shown in Figure 1. According to the principles of the present invention a connection is established between the bell crank lever 56 and the front gang for determining the position to which the forward draft applied to the bell crank lever 56 is effective to swing the lever 56 and the gangs. It will be seen from Figure 1 that the greater the permissive clockwise movement of the bell crank 56, the greater will be the angle between the gangs. Such angle control means will now be described.

The angle-determining unit acting between the bell crank 56 and the front gang is indicated in its entirety by the reference numeral 100 and, as best shown in Figure 4, comprises a bar 101 having a bifurcated end section 102 apertured to receive the associated pivot pin 76. The bar 101 is slidably disposed in a tubular section 103 formed at the rear or outer end of the forward member 104, the latter including a pair of apertured bars 105 connected, as by welding, to the sleeve section 103. The forward ends of the bars 105 are apertured to receive the pivot pin 75. The forward end of the bar 101 extends between the bars 105 in telescopic association and the movement of the bar 101 into the other bar 105 is limited by means of a quick detachable pin 108 carried by a flexible chain 109 on the member 104. The pin 108 is disposable in any one of several sets of openings 111 formed in the bars 105. The pin 108 serves as a stop limiting the inward movement of the bar and, as best shown in Figure 5, this provides for disposing the gangs in any one of several angled operating positions. A second set of openings 112 is formed in the bars 105, and the front end of the bar 101 is likewise provided with an opening 113 which, when brought into the proper position registers with one of the pairs of openings 112 so that when the pin 108 is inserted in the openings 112 as well as the opening 113 in the front end of the bar 101, it serves to lock the telescopically associated members 101, 104 against relative movement in either direction, whereby the bell crank unit 56 is likewise held against rocking movement in either direction about its point of pivotal support at 57.

When the harrow 1 is hitched to the drawbar 44 of the tractor, and the tractor driven forwardly, the draft pull is transmitted through the hitch structure 47 to the right end of the front gang 2 and to the bell crank 56 at the other end of the hitch structure. The pull being thus transmitted directly to the right end of the front gang, the front gang is thus pulled into an angled position while the resulting rocking movement of the bell crank 56 is transmitted through an angling link 120 to the rear gang adjacent the left end of the latter. The angling link 120 forms a part of the rear gang angling means L mentioned above and is connected by means of a pivot 121 to the bell crank 56 while the rear end of the link 120 is connected to the pivot 28 on the left end of the rear gang, this pivot connection being made at the left side of the pivotal connection between the front and rear gangs, whereby as the forward draft swings the bell crank 56 in a clockwise direction, as viewed in Figure 2, a forward pull is transmitted through the link 120 to the left end of the rear gang, thus pulling the latter into an angled position (Figure 1) at the same time that the forward gang is pulled into an angled position. The parts are arranged so that when the harrow reaches its working position, the pivot point 121 moves into a position closely adjacent the pivot 57 while the pivot connection 71 between the hitch structure 40 and the bell crank 56 is at a considerable distance from the pivot 57. In this way, the forward draft pull, applied at the pivot 71, acts with an appreciable mechanical advantage to pull the rear gang into an angled position. The rear gang under adverse soil conditions may tend to run out of angle, but this tendency is opposed by the fact that the line of pull transmitted through the link 120 passes quite close to the pivot 57, the moment arm being indicated in Figure 1 by the reference character $a$, whereas the forward draft pull, transmitted to the pivot point 71, acts with a much longer lever arm, as indicated by the reference character $b$ in Figure 1. Therefore, regardless of soil conditions, the draft pull acts with sufficient force to hold the gangs in their angled positions under all conditions of operation.

Normally, the gangs are straightened by backing the outfit, the soil resistance against the disks serving to swing them into their transport or parallel positions, as shown in Figure 2. This backing action causes the bell crank 56 to turn in a counterclockwise direction, thereby withdrawing the bar 101 from within the forward portions of the bars 105. When the gangs reach their straightened position, the operator may remove the pin 108 from the openings 111 and drop the pin into the forward set of openings 112 (Figure 5), in which position the front end of the bar 101 comes into abutting relation with the pin 108. This determines the transport position of the gangs when moving forwardly, and the outfit may be driven along a road, lane or the like and the disks will roll freely. If it should be desired to back the outfit in transport position, the pin 108 is placed in the rear set of holes 112 and in the hole 113 in the bar 101, thus locking the gangs in straightened position. In operation, a left turn is normally made with the gangs in their angled position, as shown in Figure 1, but if it should be desired to make a right turn, which ordinarily is not required very frequently, the pin 108 is placed or retained in the forward holes 112 (Figure 5) and an offset turning bar 125 is fixed to the rear of the tractor and connected by a turning chain 126 to the front gang. Thus, when the tractor is turned to the right, the gangs will readily move into an angled position with the gangs converging toward the right side of the outfit, the rod 101 moving to the right (Figure 2) away from the pin 108 in the left hand opening 112 to accommodate this action.

In the harrow described above, when the operator desires to change the angle to which the harrow moves when the tractor is driven forwardly, it is necessary for the operator to dismount from the tractor and manually change the position of the stop pin 108. Under many conditions of operation it is usually not required to change the angle very frequently, and hence it is not objectionable to provide a simple stop arrangement, such as the pin 108, but under other conditions it may be desirable or necessary to change the operating angle between the disk gangs relatively frequently, in which case it becomes objectionable to require the operator to go to the trouble of stopping the outfit and dismounting from the tractor in order to manually change the location of the pin 108. Accordingly, we have provided in a modified form of the present invention an arrangement in which the gangs of an offset disk harrow of the type described above may be readily straightened or angled to the desired position from the tractor seat, even though the tractor is not equipped with a hydraulic power-operated unit, such as the one shown in the parent application identified above. Such modified construction will now be described.

Referring first to Figure 6, it will be noted that the disk harrow, together with its pivotal interconnecting means and the hitch structure and associated parts is of substantially the same construction as shown in Figures 1-5 and described above, the principal difference being that the angle-determining mechanism indicated by the reference numeral 100 in Figures 1-5 is replaced by an angled-determining mechanism which may be controlled without requiring that the operator dismount from the tractor. The modified construction of angle-determining means is indicated in Figures 6 et seq., by the reference numeral 130 and comprises a pair of telescopically associated members 131 and 132 pivotally connected at their outer ends, as by the pivot pins 75 and 76 to the bell crank 56 and the apertured lug 77 on the front gang frame 4. The angle control member 131 comprises upper and lower bar sections 133 and 134 welded at their inner ends to strips 135 which form, in conjunction with the bars 133 and 134, a tubular or sleeve section 136 in which the inner end of the cooperating telescopically associated member 132 is received. The latter member comprises a square bar 137 and a pair of apertured lugs 138 welded to the outer end of the square bar 137, the apertures in the lugs 138 receiving the pivot pin 76. The upper and lower bars 133 and 134 of the angle control member 131 are provided with a plurality of apertures 141 adjacent the outer end of the member 131, and, inwardly thereof, another pair of apertures 142. The extension of the telescopically associated members 131 and 132 is limited by means of a stop pin 144 which is removably inserted in an opening 145 in the inner end of the square bar 137, the pin 144, when in place in the opening 145, being held rigidly in place by means of a locking screw 146. Access to the locking screw 146 is obtained through the opening 142 in the upper bar 133 of the member 131. By loosening and/or removing the locking screw 146, the stop pin 144, which engages the adjacent ends of the strips 135 to limit the outward movement of the member 132 relative to the member 131, may be removed. When the stop pin 144 is in place, as shown in Figure 7, backing the harrow serves to move the disk gangs from their operating or angled position into a parallel or transport position, during which action the bell crank 56 swings in such a direction as to draw the member 131 away from the member 132, but the pin 144 is positioned so that when the gangs reach their parallel position the ends of the strips 135 come up against the pin 144, thereby preventing the harrow gangs from moving past their straightened or transport position when the harrow is backed. As best shown in Figure 7, the openings 142 are so placed in the bars 133 and 134 that they come substantially in register with the inner end of the square bar 137 when the pin 144 lies against the adjacent ends of the strips 135. When the stop pin 144 is detached from the bar 137, the harrow gangs may be swung past their transport or straightened position and into an oppositely angled position, by backing the tractor. This feature of the present invention will be referred to in more detail later. When a forward pull is exerted on the hitch 46 of the harrow and the outfit driven forwardly, the soil pressure against the disks serves to swing the gangs into an angled or working position. During this action the bell crank 56 is swung in such direction as to move the member 131 in telescoping relation with respect to the bar 132, and the harrow gangs continue to move into a position of increasing angle until the inner end of the bar 137 comes up against a stop or an abutment. In the instant form of the invention the angle-determining stop comprises a new and improved latch box unit 150 which will now be described.

The angle-controlling latch unit 150 is mounted for sliding movement on the member 131 longitudinally thereof and along the line of apertures 141 and 142. The unit 150 comprises a latch box or frame made up of a pair of side plates 151 and 152 suitably connected together by intermediate and lower spacer bars 153 and 154 and at their upper edges by a generally circular abutment plate 155. The latter and the spacing bars 153 and 154 are provided with aligned apertures. A vertically disposed locking plunger 157 is disposed in the apertures in the intermediate bar 153 and the abutment plate 155 and extends upwardly above the surface of the latter member a distance sufficient to receive a generally horizontally disposed, operating lever 158 pivotally connected thereto. Preferably, the lever 158 is made up of a pair of bars 159 which are apertured to receive a pivot pin 161 that extends through a transverse opening in the upper or extended end of the locking plunger 157. The lever 158 extends in opposite directions from the pivot 161 and normally is disposed flat against the abutment plate 155 by virtue of a spring 162 which is disposed between the under side of the plate 155 and a stop washer 164 which is held in place by a pin 165 extending through an opening in the lower portion of the locking plunger 157, just above the intermediate spacer plate 153. An operating cable 166 is connected to the longer end of the lever 158, and the lower end 167 of the plunger 157 extends downwardly, when the lever 158 lies flat against the plate 155, a distance sufficient to enter, and thereby be latched to, any selected opening 141 in the upper bar 133. The plunger 157 does not enter the openings in the lower bar 134, but the latter bar is apertured like the upper bar 133 to provide for convenience in manufacture and assembly. A cross bar 171 is carried by the lower portions of the side plates 151 and 152 and extends laterally outwardly through openings 172 formed in the side plates 151 and 152. The outer ends of the bar 171 are apertured to receive cotters 173 or the like to which the adjacent ends of a pair of springs 175 and 176 are connected. The other ends of the springs 175 and 176 are connected to an anchoring hook or yoke 177 which, as best shown in Figure 7, is secured, as by welding, to the outer end of the upper lug 138 of the member 132. The crossbar 171 is disposed in the path of movement of the forward or inner end of the bar 137 and, when the latch box unit 150 is locked to the member 131, the bar 171 serves as a stop limiting the movement of the bar in an inward or retracting direction. Normally, the rope or cable 166 extends from the outer end of the latch control lever 158 toward the operator's seat on the tractor, the locking plunger 157 and the control lever therefor being free to swing around the generally vertical axis of the plunger 157. As will be understood by those skilled in the art, offset disk harrows are sometimes arranged to be angled in working position in a direction opposite to that shown in Figure 6, in which case the harrow is offset toward the other side of the tractor, and in order to secure this arrangement the hitch 46 is reversed. This disposes the tractor in a different position relative to the harrow and hence the cable 166 and lever 165 lie in a somewhat different position relative to the latch box or frame 150. The lever 158 and plunger 157 are freely swingable about the axis of the plunger, and in any position of the lever 158 about the axis of the plunger 157, a generally upwardly directed pull on the cable 166 causes the other end of the lever 158 to act against the abutment plate 155 and raise the plunger 157 until the lower end moves out of the associated aperture 141 in the upper bar 133. This frees the latch unit 150 for movement along the bar 131, either to another of the apertures 141 or to the aperture 142, in which case release of the cable permits the spring 162 to move the lower end of the plunger 157 into the opening 142 thereby disposing and locking the stop member 171 in a position substantially against the inner end of the bar 137, with the stop member 144 of the latter against the ends of the strips 135. In this position of the parts the angle control unit 130 is locked in its extended position, which maintains the harrow gangs straightened in their transport position.

The operation of this form of offset disk harrow as just described is substantially as follows. Assuming that the harrow is in its straightened or transport position, to bring the same into a working position the operator drives the tractor forwardly. The harrow gangs will automatically move into their angled or working position, the bar 137 moving forwardly into retracted position relative to the companion bar 131 until the inner end of the bar 137 comes up against the stop member 171 of the latch unit 150, assuming that the latter is in a working position adjacent the outer end of the member 131, as shown in Figure 7. If, for example, the locking plunger 157 is disposed in one of the intermediate openings 141, and that the operator desires to increase the angle between the disk gangs, all the operator has to do is to exert a pull on the cable 166 which raises the plunger 157 out of the intermediate opening 141, whereby the soil pressure against the disks acts to increase the angle between the disk gangs, whereupon the bar 137 moves further inwardly of the bar 131 moving the latch unit 150 relative to the bar 131. When the disk gangs reach the position desired by the operator he releases his hold on the cable 166, permitting the plunger 157 to enter into an adjacent opening 141, thereby terminating further retracting movement of the angle-determining unit 130 and thereby locking the gangs in the angled position selected.

If, on the other hand, a reduced angle of operation is desired, the operator stops the tractor, pulls on the cable 166 to lift the plunger 157 from the associated opening 141 and then backs the tractor. The soil pressure against the disks when backing the outfit serves to reduce the angle, and as the angle between the disk gangs is reduced the corresponding movement of the bell crank 56 draws the member 131 away from the member 132, and as this occurs the springs 175 and 176 cause the latch box unit 150 to move substantially with the inner end of the bar 132, relative to the bar 131. Therefore, when the desired reduced angle is reached, the operator releases his hold on the cable 166, permitting the plunger 157 to enter an adjacent opening 141, thereby limiting further angle-reducing movement of the latch box 150. Then the tractor is driven forwardly and the angle of the gangs increased until the inner end of the bar 137 comes up against the stop bar 171 in the new position of the latch unit 150.

If it is desired to transport the harrow, as along headlands, roads and the like, with the gangs in their straightened position, the operator backs the tractor while pulling upwardly on the cable 166 to release the plunger 157 from the opening 141. Then as the harrow approaches and reaches its straightened or transport position, with the latch unit 150 following the inner end of the bar 137, the plunger 157 is permitted to enter the opening 142 by the operator releasing the cable 166 when the disk gangs reached their straightened position. Thereafter, so long as the latch box 150 is retained or locked in their the disk gangs are held or locked in their straightened or transport position, and the harrow may then be driven either forwardly or backwardly as desired without having the disks move out of their transport position.

When the latch box 150 is in an operating position, as indicated in Figure 7, and it is desired to back the outfit it is not necessary for the operator to do anything to the latch box unit 150. Backing of the harrow in its operating position, with the latch box 150 locked to the outer end portion of the angle-control member 131, results in a straightening movement of the disk gangs, but when the pin 144 comes up against the strips 135, the disk gangs are held against moving past their straightened position while backing the outfit. Therefore, the outfit may continue to be backed as long as desirable without changing the position of the latch unit 150. Then, when forward travel is resumed, the harrow automatically goes into its operating position and at the same angle as before, as determined by the unchanged position of the latch unit 150.

Under some conditions of operation it may be desirable to arrange the harrow so that a turn against the normal working angle of the gangs may be made. Generally, offset disk harrows are operated in a position offset to the right of the propelling tractor, with the gangs in working position lying at an angle to one another but diverging to the right. When the harrow is in this position the outfit is capable of being turned to the left, which is toward the apex of the angle at which the gangs in their working position are disposed. However, if it should be desired to turn the outfit to the right it becomes necessary to provide means whereby the angle between the gangs may be reversed, that is, the gangs must be swung past their normally straightened or transport position and into an oppositely angled position. It will be remembered that when the stop pin 144 is in place in the inner end of the bar 137, it normally prevents movement of the harrow past its straightened position. Therefore, in order to arrange the harrow for a right turn, the pin 144 must be removed and a right-turn-control mechanism applied which, responsive to a right turn of the tractor, serves to pull the disk gangs into their oppositely angled positions so as to facilitate the making of the turn to the right. It will be remembered, however, that for normal operation it is a desirable feature to have the harrow so constructed and arranged that, when backing the same, whether or not the harrow is arranged to accommodate a turn to the right, the disk gangs will not be moved beyond their straightened or angled position so long as the outfit is being backed, and it will also be remembered that a removal of the locking pin 144, in the harrow described above, removes the means that holds the gangs in their straightened position when backing.

According to the principles of the present invention we provide not only means to facilitate the making of a right turn but also means associated therewith which retains the desirable feature just mentioned, namely, the feature which normally prevents the harrow, when being backed, from moving past its straightened or transport position. Such means will now be described.

Referring now to Figure 10, it will be seen that we provide an abutment 181 which is attachable by a pair of bolts 182 to the forward end of the angling bar 120 which, for the purposes of receiving the right-turn control, may usually be provided with a pair of holes 183 (Figure 7) to receive the bolts 182. Cooperating with the abutment 181 on the angling bar is a sliding stop member 185 mounted for lateral movement on the front bar 5 of the front gang. The stop member 185 comprises a pair of vertical plates 186 disposed about the associated frame bar and held in place by suitable bolts 187, spacing bushings 188 disposed about the bolts 187, and a pair of spacing blocks 189 welded to the ends of the plates 186 at the end contacted by the abutment plate 181. To provide means that responds to a right turn of the tractor, we provide a turning bar 191 which may be attached at any suitable point to the tractor, at the left of the hitch point between the tractor and the hitch 40. Connected to the turning bar 191 is a slotted plate 192 which receives and connects to any one of a number of links of a right-turn chain 193. The chain 193, which represents any convenient form of flexible element, extends rearwardly and passes through an opening 194 in a direction-changing member in the form of a plate 195 secured by a pair of U-bolts 196 to the forward bar of the front gang frame. The laterally turned and transversely movable rear end portion of the chain 193 is connected by a bolt 197 to the adjacent end of the sliding stop 185. A spring 198 is connected at one end to the sliding stop 185 and at the other end to a hook member 199 which is connected to any convenient point on the gang frame, such as the upper pivot plate 58a on which the bell crank 56 is mounted.

The parts are so constructed and arranged that, as shown in Figure 10, the sliding stop 185 is normally positioned so as to be engaged by the abutment member 181 when the tractor is backed and the soil pressure against the gangs moves them into a straightened position, the plate 181 being fixed to the angling bar 120, which moves rearwardly when the gangs are swung from their normal working position into a straightened position, so that it engages the sliding stop 185 at the moment the gangs reach their parallel or straightened position. Therefore, the gangs are prevented by the stop means 181, 185 from moving beyond their straightened or transport position when the outfit is backed, which permits leaving the latch unit 150 in its normal working position, so that after the backing operation is completed and the outfit then driven forwardly the gangs automatically go into their previously determined operating position without requiring any change in the position of the latch 150. However, if it should be desired to make a turn to the right, in which case the angling bar 120 necessarily moves to a point farther rearwardly from that shown in Figure 10, the right-turn chain 193 and associated parts constitute means that responds to a right turning movement of the tractor to draw the slide 185 away from the abutment 181 on the angling bar 120. By drawing the slide 185 out of the path of movement of the abutment 181, a rearward movement of the angling bar 120, necessary to accommodate the arrangement of the gangs in their oppositely angled position to facilitate the right turn, is permitted. The slide 185 is drawn toward the left end of the front gang frame whenever the forward end of the chain 193 is pulled forwardly, as by the tractor turning to the right relative to the harrow hitch 40. Therefore, the right-turn responsive mechanism just described serves not only to facilitate the turning of the harrow to the right but also retains the advantage that when the harrow is backed the gangs are locked against moving beyond their straightened position, thereby facilitating the backing of the outfit. When the right-turn means, that is, the chain 193 and associated parts, are not supplied it is necessary to insert the stop pin 144 in the inner end of the bar 137, in order to lock the gangs against moving beyond their straightened or transport position when backing the outfit.

While we have shown and described above the preferred structure in which the principles of the present invention have been incorporated, it is to be understood that our invention is not to be limited to the exact details shown and described above, but that, in fact, widely different means may be employed in the practice of the broader aspects of our invention.

What we claim, therefore, and desire to secure by Letters Patent is:

1. An offset disk harrow comprising front and rear gangs pivotally interconnected for movement into and out of angled and straightened positions, a bell crank pivotally mounted on the front gang adjacent one end thereof, a hitch structure pivotally connected at one side to the front gang adjacent the other end thereof and at the other side to one portion of said bell crank, an angling connection between the other portion of said bell crank and the rear gang, and angle-determining means connected between the bell crank and the front gang for limiting the movement of the bell crank in the direction that accompanies angling of said gangs, comprising a pair of relatively movable parts, a stop unit slidable on one of said relatively movable parts, releasable means carried by said slidable stop and releasably engageable with said one part for controllably latching said stop unit to said one part so as to serve as a stop limiting relative movement between said parts in one direction, and spring means connected with said stop unit for shifting the latter in one direction along said one part when said unit is released therefrom.

2. An angle-determining means for disk harrows or the like including a pair of relatively movable members, the relative positions of which determine the angle between the gangs of the harrow, said angle-determining means comprising a pair of relatively slidable parts adapted to be connected, respectively, to said relatively movable members, one of said parts having at one end a plurality of apertures, a latch box slidable on said one part and including stop means engageable by an end of said other part when the latter moves in a direction toward said one end of said one part for limiting relative movement between said parts in that direction, a latching plunger engageable in any of said plurality of apertures for locking said stop means in various positions relative to said one part, and means for operating said plunger, and spring means acting between said other part and said latch box for causing the latter to be positioned along said one part when said latching plunger is released from said one part and said other part is moved in the other direction.

3. An angle-determining means for disk harrows or the like including a pair of relatively movable members, the relative positions of which determine the angle between the gangs of the harrow, said angle-determining means comprising a pair of relatively slidable parts adapted to be connected, respectively, to said relatively movable members, one of said parts having at one end a plurality of apertures and a transport aperture spaced from said plurality of apertures toward the other end of said one part, a latch box slidable on said one part and including stop means engageable by an end of said other part when the latter moves in a direction toward said one end of said one part for limiting relative movement between said parts in that direction, said relatively movable members having means limiting the relative movement between said members in the other direction, which defines the transport position of the harrow, said transport aperture lying adjacent the inner end of said other part when the latter is in the transport position, a latching plunger engageable in any of said plurality of apertures for locking said stop means in various positions relative to said one part and also engageable in said transport aperture when said other part is in its transport position, and means for operating said plunger, and spring means acting between said other part and said latch box for causing the latter to be positioned along said one part when said latching plunger is released from said one part and said other part is moved in the other direction.

4. In an agricultural implement, a pair of adjacently associated members, one movable relative to the other, stop means carried by one of said members in a position to serve as a stop for limiting the movement of the other member relative to said one member in one direction, said stop means being shiftable relative to said one member into different positions relative thereto, releasable latch means acting between said stop means and said one member for optionally fixing said stop means to said one member, and spring means extending between said other member and said stop means for causing the latter to be moved to different positions relative to said one member by virture of movement of said other member when said latch means is released.

5. In a disk harrow of the type having pivotally interconnected gangs and hitch means connected therewith whereby said gangs tend to move into different positions of angle by virtue of soil pressure against the gangs when forward or rearward draft is applied to said hitch means: the improvement which comprises a pair of adjacently associated members, one movable relative to the other and adapted to be connected, respectively, to move with said gangs when the gangs move, stop means carried by one of said members in a position to serve as a stop for limiting the movement of the other member relative to said one member in one direction, thereby serving to determine the angular position of one gange relative to the other, said stop means being shiftable relative to said one member into different positions relative thereto, releasable latch means acting between said stop means and said one member for optionally fixing said stop means to said one member, and spring means extending between said other member and said stop means for causing the latter to be moved to different positions relative to said one member by virtue of movement of said gangs and the resultant movement of said other member when said latch means is released.

6. In a disk harrow of the type having pivotally interconnected gangs and hitch means connected therewith whereby said gangs tend to move into different positions of angle by virtue of soil pressure against the gangs when forward or rearward draft is applied to said hitch means: the improvement which comprises a pair of telescopically associated members connected at their outer ends with said gangs to move concomitantly therewith, stop means carried by one of said members and engageable with the other for limiting relative movement therebetween in a direction to prevent said gangs from moving beyond a parallel position when a rearwardly directed force is applied to said hitch means to back the harrow, and a second stop means movably carried by one of said members in a position to be engaged by the other member, when a forwardly directed force is applied to said hitch means, for determining the angle between said gangs when in a working position.

7. An offset disk harrow comprising front and rear gangs, means disposed intermediate the ends of the gangs for pivotally connecting them together for movement into and out of angled and transport positions, a hitch structure, means connecting one side of the hitch structure to the front gang at one side of said pivotal interconnecting means between the gangs, a bell crank mounted on the front gang generally adjacent the other end thereof and including a pair of arms, an angling bar connected at its forward end with one of said arms and at its rear end with the rear gang generally at the other side of said pivotal interconnecting means between the gangs, means pivotally connecting the other side of said hitch structure with the other of said bell crank arms whereby a forward pull transmitted to said bell crank exerts a force tending to rotate said bell crank and move said angling link forwardly to swing said rear gang into angled position, an abutment on said angling bar, a part adapted to be movably mounted on one of said gangs in a position to cooperate with said abutment for limiting the rearward movement of said angling bar so as to hold said gangs in substantial parallelism when the harrow is backed by virtue of a rearwardly directed force applied to said hitch device, and means responsive to turning of the tractor in one direction relative to the hitch device for shifting said part away from said abutment to provide for angling said gangs in the other direction.

8. For use in a tractor-propelled offset harrow of the type including a pair of pivotally interconnected gangs normally angled in one direction, a hitch device pivoted at one side to the forward gang and connected at the other side through a generally fore and aft extending link with the rear gang, and means separate from said link and acting between said hitch device and said front gang for controlling the angle between said gangs when the harrow is drawn forwardly: the improvement comprising an abutment attachable to said link, a part adapted to be movably mounted on one of said gangs in a position to cooperate wtih said abutment for limiting the rearward movement of said link so as to hold said gangs in substantial parallelism when the harrow is backed by virtue of a rearwardly directed force applied to said hitch device, and means responsive to turning of the tractor in one direction relative to the hitch device for shifting said part away from said abutment to provide for angling said gangs in the other direction.

9. In a tractor-propelled type of disk harrow, a pair of pivotally interconnected gangs, one being disposed ahead of the other and including a transverse frame bar, means for controlling the angle between said gangs including a generally fore and aft extending angling bar, an abutment fixed to said bar, a stop slidable laterally on said transverse frame bar into and out of the path of movement of said abutment, a right turn responsive means comprising a flexible element connected at its rear end with said slidable stop and adapted to be connected at its forward end to the tractor, and direction-changing means on said one gang and receiving the rear portion of said element whereby fore and aft movement of the forward portion of said element shifts the rear end of said flexible element laterally and thereby shifts said stop along said transverse frame bar laterally relative to said angling bar.

10. In a disk harrow or the like having a pair of telescopically associated members, one comprising a pair of spaced-apart, generally parallel bars between which the other member is longitudinally shiftable, the improvement comprising a latch unit mounted on said one member and including a frame, receiving and connected with the spaced-apart bars of said one member, and a stop member carried by said frame and having a portion disposed between said bars, said stop member being adapted to be engaged by the other of said telescopically associated members, and means carried by said frame and including a portion engageable with at least one of said bars for securing said frame in different position along said bars.

11. In a disk harrow or the like having a pair of telescopically associated members, one having a plurality of apertures therein and the other movable into different positions along the line of said apertures, the improvement comprising a latch unit adapted to be mounted on said one member and having a frame movable into different positions along said line of apertures, an abutment carried by said frame in a position to be engaged by the other of said members, a locking plunger movable in said frame into and out of position in selected apertures, and means connected with said plunger and acting against said frame for operating said plunger.

12. In a disk harrow or the like having a pair of telescopically associated members, one having a plurality of apertures therein and the other movable into different positions along the line of said apertures, the improvement comprising a latch unit adapted to be mounted on said one member and having a frame movable into different positions along said line of apertures, an abutment carried by said frame in a position to be engaged by the other of said members, a locking plunger movable in said frame into and out of position in selected apertures, and means connected with said plunger and acting against said frame for operating said plunger, and spring means connected between said other member and said latch unit, when said locking plunger is released from said apertures, for causing the latter to be shifted along said one member until said abutment engages said other member, said abutment being located on said frame so that, when said abutment engages said other member, said plunger is in a position to enter an adjacent aperture.

13. In an offset disk harrow of the type having pivotally interconnected gangs and angle control means including lever means pivoted to one of the gangs and turnable relative thereto when the angle between the gangs is changed: the improvement comprising a pair of relatively shiftable members connected, respectively, with said one gang and said lever means to move therewith, a latch box unit mounted on one of said members and including a latch normally latched with respect to said one member, said latch box unit including means carried thereby in a position to be engageable with the other member to limit the movement of said lever means relative to said one gang, said latch box unit being shiftable relative to said one member into different positions, and spring means connected between said other member and said latch box unit for causing the latter to be shifted relative to said one member when said latch is released from both of said members, the engageable means carried by said latch box unit being located so that, when said means engages said other member, said latch is in latching position with respect to said one member.

References Cited in the file of this patent

UNITED STATES PATENTS

| Number | Name | Date |
|---|---|---|
| 309,932 | Crane | Dec. 30, 1884 |
| 1,798,264 | Lueters | Mar. 31, 1931 |
| 1,831,947 | Brodersen et al. | Nov. 17, 1931 |
| 1,834,519 | Dewend | Dec. 1, 1931 |
| 1,956,845 | White | May 1, 1934 |
| 2,152,928 | Sjorgren et al. | Apr. 4, 1939 |
| 2,169,471 | Mitchell et al. | Aug. 15, 1939 |
| 2,180,458 | Clausen | Nov. 21, 1939 |
| 2,237,009 | Mitchell | Apr. 1, 1941 |
| 2,318,275 | White | May 4, 1943 |
| 2,571,512 | Youngberg | Oct. 16, 1951 |